US011806652B2

(12) United States Patent
Stamey, Jr. et al.

(10) Patent No.: US 11,806,652 B2
(45) Date of Patent: Nov. 7, 2023

(54) END CAP FOR A FILTER ELEMENT

(71) Applicant: MANN+HUMMEL Filtration Technology US LLC, Gastonia, NC (US)

(72) Inventors: Willie L. Stamey, Jr., Kings Mountain, NC (US); Mark A. Roll, Bessemer City, NC (US)

(73) Assignee: MANN+HUMMEL Filtration Technology US LLC, Gastonia, NC (US)

( * ) Notice: Subject to any disclaimer, the term of this patent is extended or adjusted under 35 U.S.C. 154(b) by 310 days.

(21) Appl. No.: 17/173,670

(22) Filed: Feb. 11, 2021

(65) Prior Publication Data
US 2022/0249998 A1    Aug. 11, 2022

(51) Int. Cl.
*B01D 46/00* (2022.01)
*B01D 46/52* (2006.01)

(52) U.S. Cl.
CPC ..... *B01D 46/0004* (2013.01); *B01D 46/0005* (2013.01); *B01D 46/521* (2013.01); *B01D 2265/021* (2013.01); *B01D 2265/022* (2013.01)

(58) Field of Classification Search
CPC ............ B01D 46/0004; B01D 46/0005; B01D 46/521; B01D 2265/021; B01D 2265/022
USPC .......................................................... 55/490
See application file for complete search history.

(56) References Cited

U.S. PATENT DOCUMENTS

| 6,440,188 | B1 | 8/2002 | Clements et al. |
| 6,517,598 | B2 | 2/2003 | Anderson et al. |
| 7,169,302 | B2 | 1/2007 | Stockbower |
| 2006/0186031 | A1* | 8/2006 | Fick ..................... B01D 36/003 210/235 |
| 2011/0132829 | A1 | 6/2011 | Tucker et al. |
| 2011/0168613 | A1* | 7/2011 | van Savooijen ....... B01D 29/15 210/232 |
| 2012/0261322 | A1 | 10/2012 | Yang |
| 2015/0343349 | A1* | 12/2015 | Wells ..................... B01D 29/52 210/232 |
| 2020/0407936 | A1 | 12/2020 | Wells et al. |

OTHER PUBLICATIONS

International Search Report and Written Opinion for Application PCT/US2022/015829 dated Jun. 2, 2022 (ISA/KR).
International Preliminary Report on Patentability with Written Opinion for Application PCT/ US2022/015829 dated Aug. 24, 2023.

* cited by examiner

*Primary Examiner* — Robert A Hopkins
(74) *Attorney, Agent, or Firm* — Honigman LLP

(57) ABSTRACT

A filter assembly includes a housing, a filter element, and an end cap. The housing includes an interior surface, an exterior surface, and a protrusion. The interior surface defines an interior volume. The exterior surface is opposite the interior surface. The protrusion extends from the exterior surface. The filter element is configured to be disposed at least partially in the interior volume of the housing. The end cap includes an axially-extending outer rim defining a slot configured to receive the protrusion to inhibit rotation of the end cap relative to the housing.

8 Claims, 6 Drawing Sheets

END CAP FOR A FILTER ELEMENT

FIELD

The present disclosure relates generally to end caps for filter elements.

BACKGROUND

This section provides background information related to the present disclosure and is not necessarily prior art.

Filters are used in a variety of applications and industries, including automotive, marine, industrial, construction, aerospace, etc. Filters may be used to filter a variety of substances, including gases such as air, liquids such as oil, etc. Filters may be assembled using a variety of hardware and tools, which may add additional cost and complexity.

SUMMARY

This section provides a general summary of the disclosure, and is not a comprehensive disclosure of its full scope or all of its features.

One aspect of the disclosure provides a filter assembly. The filter assembly includes a housing, a filter element, and an end cap. The housing includes an interior surface, an exterior surface, and a protrusion. The interior surface defines an interior volume. The exterior surface is opposite the interior surface. The protrusion extends from the exterior surface. The filter element is configured to be disposed at least partially in the interior volume of the housing. The end cap includes an axially-extending outer rim defining a slot configured to receive the protrusion to inhibit rotation of the end cap relative to the housing.

Implementations of this aspect of the disclosure may include one or more of the following optional features. In some implementations, the end cap includes a flange having a proximal end and a distal end opposite the proximal end. The proximal end may be supported by the outer rim. The distal end may be at least partially disposed within the slot. The distal end of the flange may include a head portion defining a head surface and a shoulder surface. The shoulder surface may extend from the head surface. An angle between the head surface and the shoulder surface may be less than 90 degrees. When the end cap is secured to the housing, an inner surface of the flange may be adjacent the exterior surface of the housing.

In some implementations, the end cap includes a main body and a protrusion extending from the main body. The outer rim may extend from the main body in a direction opposite the protrusion. A center axis of the protrusion may be coaxial with a center axis of the main body. The end cap may be movable between an unlocked position and a locked position relative to the housing via rotation of the end cap about the center axis of the main body.

In some implementations, the housing defines a second protrusion extending from the exterior surface of the housing and spaced from the protrusion. The outer rim may define a second slot configured to receive the second protrusion. The end cap may include a second flange extending into the second slot. The end cap may be selectively secured to the housing via simultaneously positioning the protrusion within the slot and the second protrusion within the second slot.

Another aspect of the disclosure provides an end cap for a filter element. The end cap may include a main body, an outer rim, a protrusion, and a flange. The outer rim may extend from the main body in a first axial direction and define a slot. The protrusion may extend from the main body in a second axial direction opposite the first axial direction. The flange may include a proximal end and a distal end opposite the proximal end. The proximal end may be supported by the outer rim. The distal end may be at least partially disposed within the slot.

This aspect may include one or more of the following optional features. In some implementations, the distal end of the flange includes a head portion defining a head surface and a shoulder surface. The shoulder surface may extend from the head surface. An angle between the head surface and the shoulder surface may be less than 90 degrees.

In some implementations, a center axis of the protrusion is coaxial with a center axis of the main body. The end cap may be movable between an unlocked position and a locked position via rotation of the end cap about the center axis of the main body.

In some implementations, the outer rim extends from a proximal end to a distal end. The proximal end may be disposed at the main body. The distal end may be spaced from the proximal end. The proximal end of the flange may be secured to the distal end of the outer rim.

In some implementations, the slot is configured to engage a protrusion of a filter housing.

In some implementations, the outer rim defines a second slot spaced from the slot. The end cap may include a second flange extending into the second slot.

Yet another aspect of the disclosure provides a method. The method may include providing a housing defining an upper edge, an interior volume, and a protrusion extending from an exterior surface of the housing. The method may also include installing a filter element in the interior volume of the housing. The method may further include providing an end cap including a main body and an outer rim extending from the main body and defining a slot. The method may also include positioning the main body of the end cap on the upper edge of the housing. The method may also include positioning the protrusion at a first end of the slot. In some implementations, the method includes rotating the end cap to a locked position where the protrusion is disposed at a second end of the slot opposite the first end.

This aspect may include one or more of the following optional features. In some implementations, the end cap includes a flange having a proximal end and a distal end opposite the proximal end. The proximal end may be supported by the outer rim. The distal end may be at least partially disposed within the slot. The distal end of the flange may include a head portion defining a head surface and a shoulder surface. The shoulder surface may extend from the head surface. The head portion may be adjacent a first side of the protrusion when the end cap is in an unlocked position. The head portion may be adjacent a second side of the protrusion, opposite the first side of the protrusion, when the end cap is in the locked position.

In some implementations, the end cap includes a main body and an engagement feature extending from the main body. The outer rim may extend from the main body in a direction opposite the engagement feature. A center axis of the engagement feature may be coaxial with a center axis of the main body. The method may further include engaging the engagement feature with a tool and rotating the end cap to the locked position with the tool.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
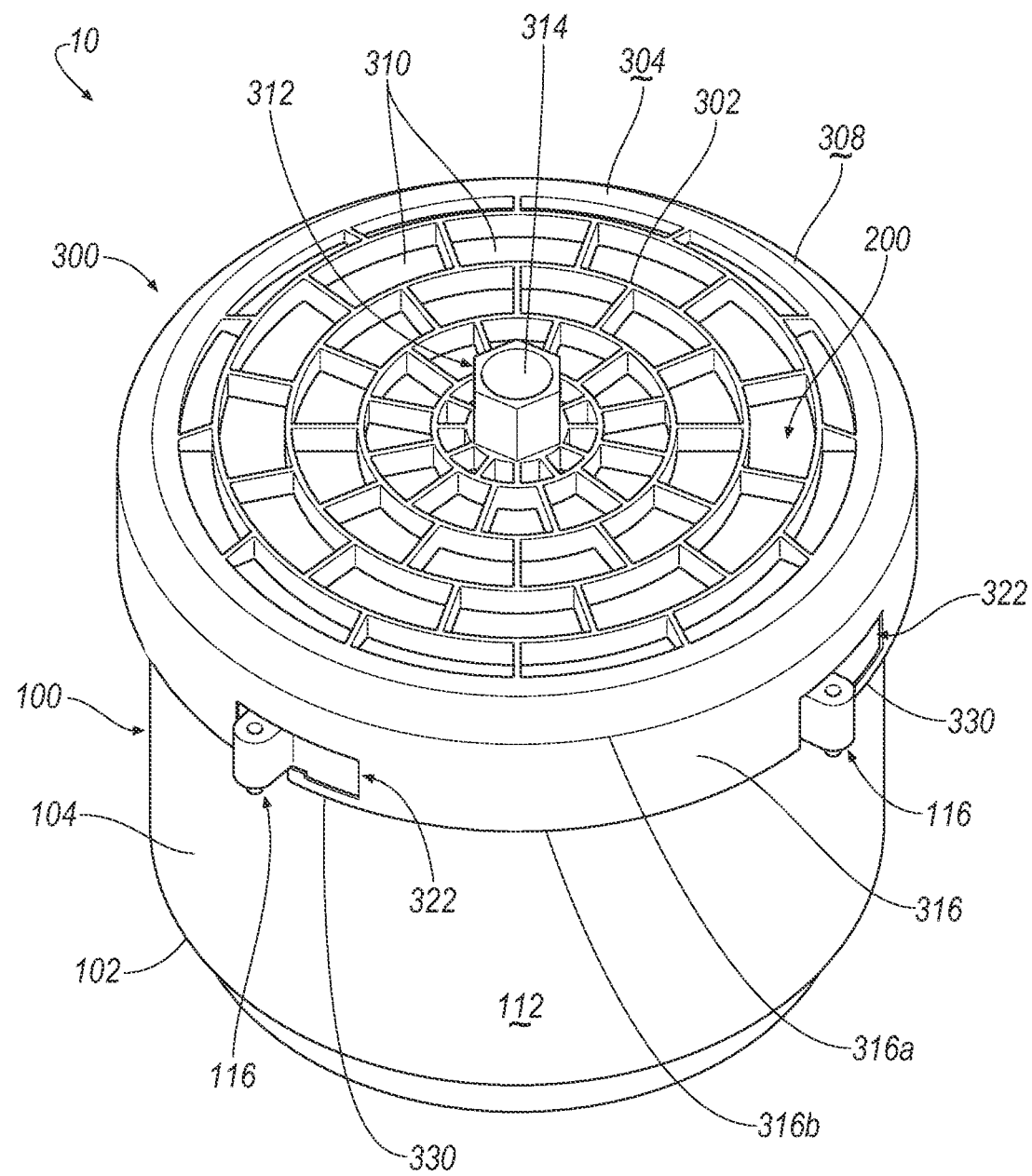
FIG. 1 is a perspective view of a filter assembly in accordance with the principles of the present disclosure.

Referring to FIG. 1, a filter assembly 10 is generally shown. The filter assembly 10 includes a housing 100, a filter element 200, and an end cap 300. The filter assembly 10 may be implemented in a variety of applications and industries, including automotive, marine, industrial, construction, aerospace, etc. The filter assembly 10 may be used to filter a variety of substances, including gases such as air, liquids such as oil, etc. In some implementations, the filter assembly 10 may be used to filter air for an engine of a heavy duty vehicle. As will become apparent, the end cap 300 may be designed to enclose the filter element 200 within the housing 100 in a manner that requires no external hardware.

Figure 2:
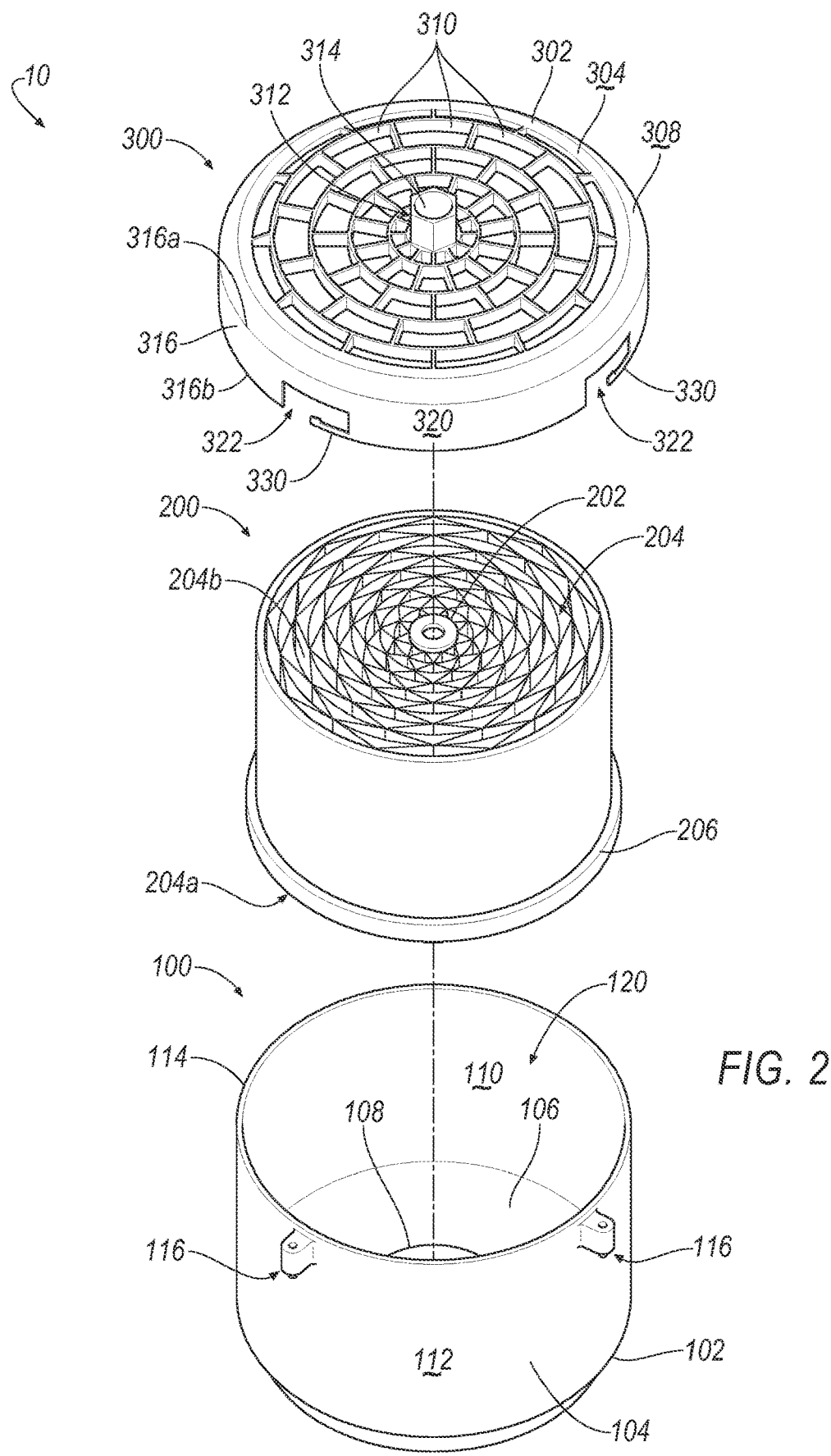
FIG. 2 is an exploded view of the filter assembly of FIG. 1.

Referring to FIGS. 1 and 2, the housing 100 includes a base 102 and an outer wall 104 extending axially from the base 102. The base 102 includes a bottom inner surface 106 defining an inlet aperture 108 extending axially through the base 102. In some implementations, the inlet aperture 108 receives an inlet flow of air or any other suitable substance. In other implementations, the flow of air or any other suitable substance may be reversed such that the aperture 108 is an outlet. The base 102 and the outer wall 104 may have a generally circular configuration as shown in the figures. In other implementations, the base 102 and the wall 104 may have any suitable shape and configuration. The housing 100 may be formed of any suitable material, such as, for example, Polyethylene Terephthalate (PETE or PET), High-Density Polyethylene (HDPE), Polyvinyl Chloride (PVC), Low-Density Polyethylene (LDPE), Polypropylene (PP), Polystyrene or Styrofoam (PS), polycarbonate, polylactide, acrylic, acrylonitrile butadiene, styrene, fiberglass, nylon, carbon fiber, any suitable metal, etc.

The outer wall 104 includes an inner or interior surface 110, an outer or exterior surface 112, and an upper edge 114 spaced from the base 102 and extending between the inner surface 110 and the outer surface 112. The outer wall 104 includes protrusions 116 extending outwardly (e.g., radially) from the exterior surface 112. In some implementations, the outer wall 104 includes four protrusions 116 evenly-spaced around the outer wall 104, e.g., each protrusion 116 may be spaced from an adjacent protrusion 116 by a quarter of a circumference of the outer wall 104. In other words, the protrusions 116 may be 90 degrees apart from one another. In other implementations, the outer wall 104 may include more or less than four protrusions 116, such as, one, two, three, five, etc.

Referring to FIGS. 1, 2, and 6-8, each protrusion 116 may include an upper surface 116a, a lower surface 116b, a first side surface 116c, and a second side surface 116d. The upper surface 116a may be opposite, and substantially (e.g., +/−5 degrees) parallel to, the lower surface 116b. The upper and lower surfaces 116a, 116b may each extend outwardly (e.g., radially) from the exterior surface 112. The first and second side surfaces 116c, 116c may be contiguous and extends axially from the upper surface 116a to the lower surface 116b. In some implementations, each protrusion 116 may include a socket 118 extending entirely through the protrusion 116. The base 102 and the outer wall 104 cooperate to define an interior volume 120. In an assembled configuration (e.g., FIG. 1), the interior volume 120 may receive at least a portion of the filter element 200.

Referring to FIGS. 1 and 2, in the assembled configuration, the filter element 200 is disposed at least partially in the interior volume 120 of the housing 100. The filter element 200 includes a core or center member 202 and a filter media 204 wrapped around the center member 202. The center member 202 may be formed of any suitable material, such as a plastic. The filter media 204 may be formed of any suitable material, such as paper, foam, cotton, stainless steel, etc. The filter media 204 may be folded, rolled, pleated, corrugated, etc., in any suitable manner. The filter media 204 may extend from an end 204a to an end 204b. In some implementations, during operation of the filter assembly 10, the end 204a may receive an inlet flow of air or any other suitable substance through the inlet aperture 108 of the base 102, and the substance may flow axially through the filter element 200 and through the end 204b and the end cap 300, as will become apparent. Accordingly, the end 204a may be referred to herein as the "inlet end 204a," and the end 204b may be referred to herein as the "outlet end 204b." It will be appreciated, however, that in other implementations, during operation of the filter assembly 10, the end 204b may receive an inlet flow of air or any other suitable substance through the end cap 300, and the substance may flow axially through the filter element 200 and through the end 204a and the aperture 108 of the base 102.

The filter element 200 includes a lower seal or gasket 206 located at or near the inlet end 204a. The lower seal 206 may be formed of any suitable material, such as a rubber, Polytetrafluoroethylene (PTFE), Fluorosilicone (FVMQ), Polyurethane (PU), etc. The lower seal 206 may be wrapped around a lower edge of the filter media 204 such that the inlet end 204a is at least partially exposed to allow air to flow through the filter media 204.

Referring to FIGS. 1-5, the end cap 300 is selectively secured to the housing 100, enclosing the filter element 200 within the interior volume 120. The end cap 300 includes a main body 302 having a generally circular shape and configuration. The main body 302 includes a center axis $A_{302}$ defining the center of the circular shape. As set forth in more detail below, the end cap 300 is configured to rotate about the center axis $A_{302}$.

Figure 5:
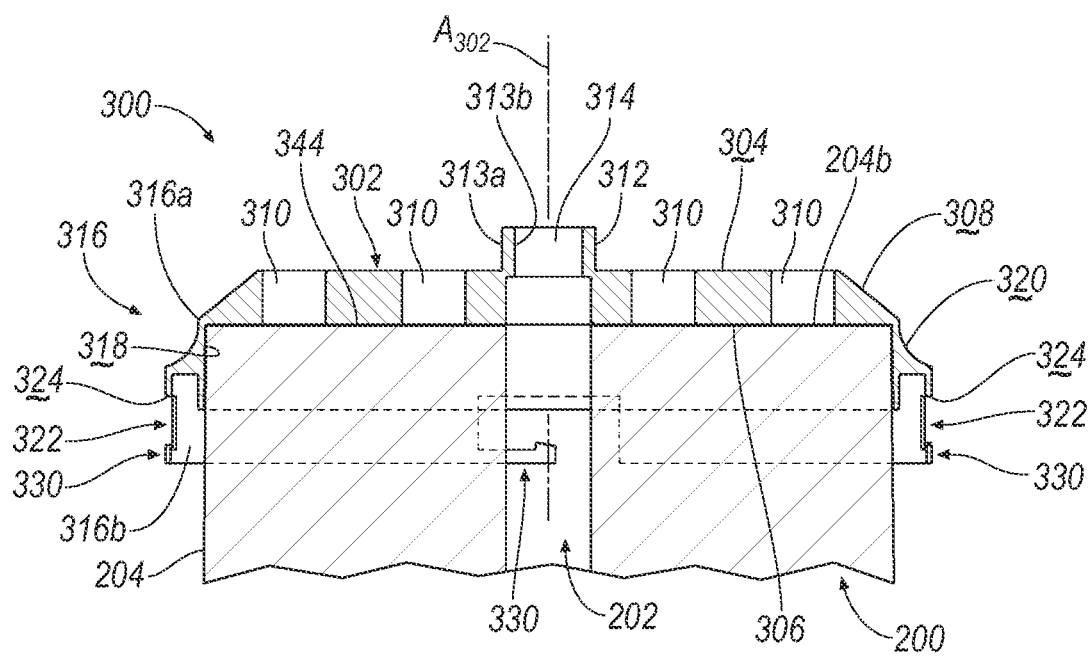
FIG. 5 is a cross-sectional view of the end cap of FIG. 3 taken along line 5-5 of FIG. 4, the end cap illustrated in an assembled configuration with a filter element of the filter assembly of FIG. 1.

With reference to FIG. 5, the main body 302 of the end cap 300 further includes an upper surface 304 and a lower surface 306. The upper surface 304 includes a chamfered surface 308 around a periphery of the main body 302. The main body 302 defines a plurality of airflow apertures 310 extending through the main body 302, e.g., axially through the upper surface 304 and the lower surface 306. The airflow apertures 310 may have any suitable shape and orientation. For example, the airflow apertures 310 may have a slightly curved rectangular shape, a straight rectangular shape, a circular shape, a triangular shape, etc. The airflow apertures 310 are configured to permit air or other substances to flow through the main body 302, e.g., air flowing through the inlet aperture 108 and through the filter media 204.

In some implementations, as shown in FIG. 5, the filter element 200 may be integrally formed with the end cap 300. In such implementations, the outlet end 204b of the filter media 204 may be affixed to the lower surface 306 of the main body 302 of the end cap 300 via a hot melt 344 or any other suitable adhesive.

The end cap 300 includes an engagement feature (e.g., a protrusion 312) extending from the upper surface 304 of the main body 302. The protrusion 312 may include an outer surface 313a and an inner surface 313b opposite the outer surface 313a. In some implementations, the outer surface 313a of the protrusion 312 defines a hexagonal shape in a cross section taken substantially (e.g., +/−5 degrees) perpendicular to the axis $A_{302}$. During assembly of the filter assembly 10, the outer surface 313a may receive a wrench or any other suitable tool to facilitate rotation of the end cap 300 about the center axis $A_{302}$.

In some implementations, the protrusion 312 may have a minimum distance (i.e., from one flat surface to an opposing flat surface) between 1 and 2 inches and a maximum distance (i.e., from one corner to an opposing corner) between 1 and 2 inches. In some implementations, the minimum distance is between 1.20 and 1.60 inches and the maximum distance is between 1.40 and 1.80 inches. The protrusion 312 may have any suitable length extending along the axis $A_{302}$ from the upper surface 304, such as between 0.5 and 1 inch, or between 0.6 and 0.9 inches. The inner surface 313b of the protrusion 312 may define a central aperture 314 extending at least partially through the protrusion 312. Similar to the airflow apertures 310, the central aperture 314 may permit air to flow through the end cap 300. The protrusion 312 is coaxial with the main body 302, i.e., a center of the protrusion 312 lies on the central axis $A_{302}$.

As illustrated in FIG. 5, the end cap 300 further includes an outer rim 316 extending axially from the lower surface 306 of the main body 302 in a direction opposite the protrusion 312. The outer rim 316 may extend axially from a proximal end 316a at a peripheral edge of the main body 302 to a distal end 316b. The outer rim 316 includes an inner surface 318 and an outer surface 320 and may define a diameter slightly larger than a diameter of the outer wall 104 of the housing 100. In particular, the inner surface 318 may define a diameter larger than the diameter of the exterior surface 112 of the outer wall 104, such that, in the assembled configuration, the inner surface 318 of the outer rim 316 faces and is adjacent the exterior surface 112 of the outer wall 104.

Figure 3:
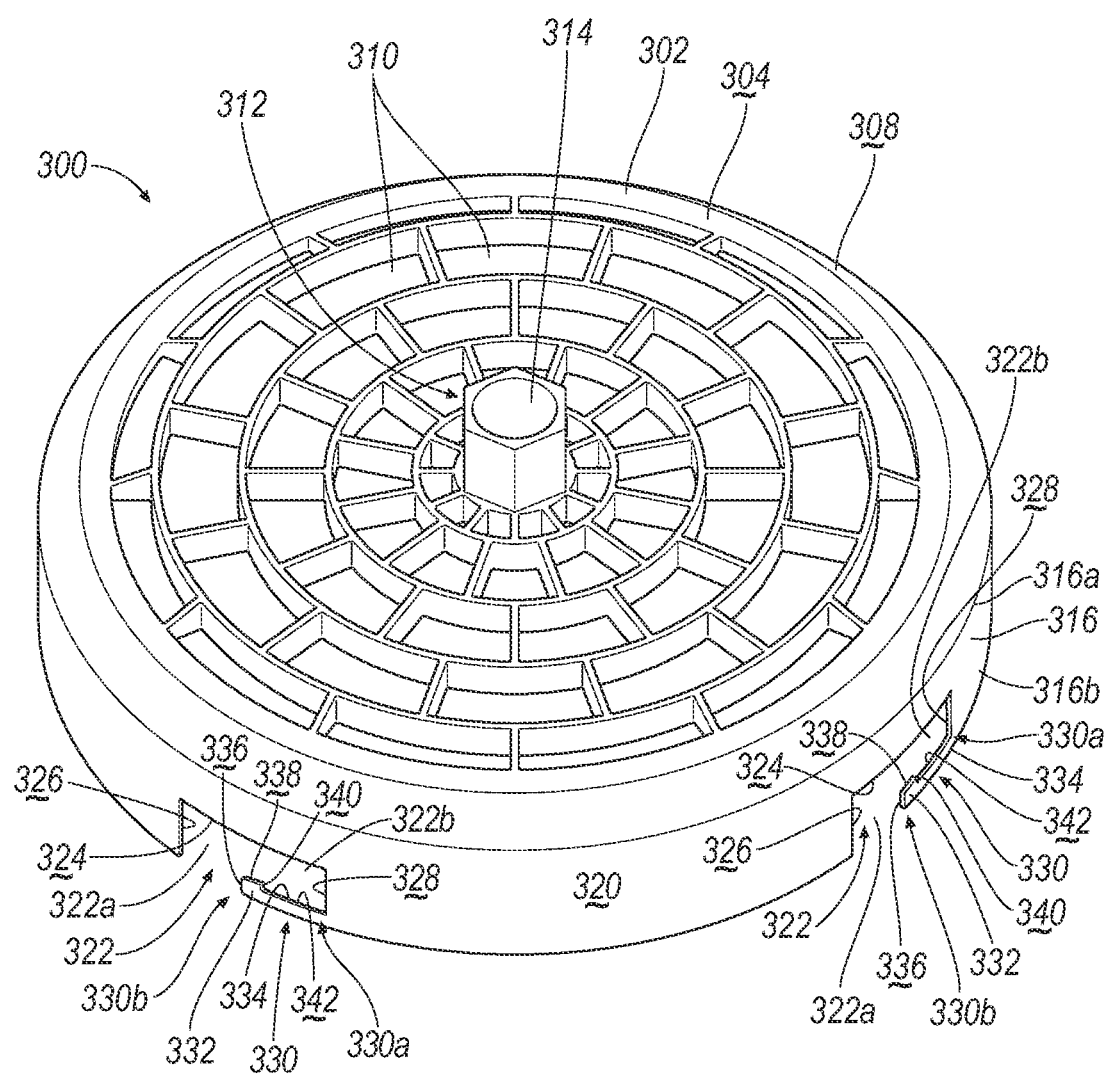
FIG. 3 is a perspective view of an end cap of the filter assembly of FIG. 1.
Figure 4:
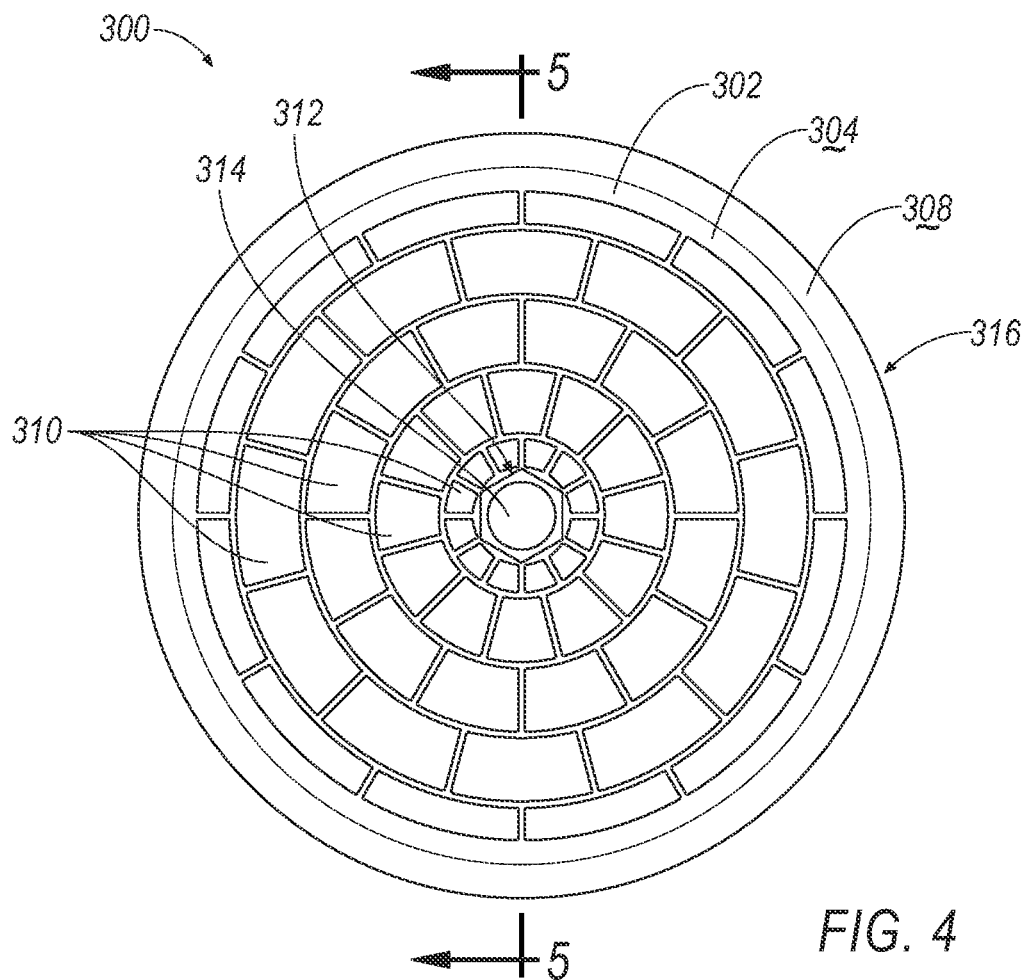
FIG. 4 is a plan view of the end cap of FIG. 3.

With reference to FIG. 3, the outer rim 316 defines one or more slots 322. In some implementations, the outer rim 316 defines four slots 322 formed in the distal end 316b and evenly spaced around the outer rim 316, e.g., each slot 322 may be spaced from an adjacent slot 322 by a quarter of a circumference of the outer rim 316. In other words, the slots 322 may be 90 degrees apart from one another. In other implementations, the outer rim 316 may define more or fewer slots 322, such as, one, two, three, five, etc. In this regard, the number of slots 322 may correspond to the number of protrusions 116, e.g., if the outer wall 104 includes four protrusions 116, then the outer rim 316 may define four slots 322.

Each slot 322 is sized and shaped to receive or engage with one of the protrusions 116. For example, each slot 322 may extend circumferentially around at least a portion of the outer rim 316. In this regard, at each slot 322, the outer rim 316 includes an upper surface 324, a side entrance surface 326, and a side lock surface 328 that each at least partially define one of the slots 322. In particular, each slot 322 may include an entrance portion 322a that extends from the distal end 316b toward the proximal end 316a at the main body 302 and a lock portion 322b that extends perpendicular to the entrance portion 322a along the distal end 316b.

Referring to FIGS. 3 and 5-7, at each slot 322, the outer rim 316 includes a flange 330 extending from a proximal end 330a adjacent to the distal end 316b of the outer rim 316 to a distal end 330b disposed within the slot 322, such that the flange 330 at least partially defines one of the slots 322. As shown in the figures, the flange 330 (e.g., the bottom surface of the flange 330) may be substantially flush with the distal end 316b of the outer rim 316. The number of flanges 330 may correspond to the number of slots 322. For example, if the outer rim 316 defines four slots 322, then the outer rim 316 may include four flanges 330. The proximal end 330a of the flange 330 may be secured to the distal end 316b of the outer rim 316 in any suitable manner, including being integrally formed with the outer rim 316, molding, welding, fasteners, gluing, etc.

Each flange 330 includes a head portion 332 at or near the distal end 330b and a body portion 334 extending from the head portion 332 to the proximal end 330a. The head portion 332 includes a distal end surface 336, a head surface 338 extending from the distal end surface 336, and a shoulder surface 340. The body portion 334 includes a lower lock surface 342. The shoulder surface 340 extends (e.g., axially) from the head surface 338 to the lower lock surface 342, and the lower lock surface extends (e.g., circumferentially) from the shoulder surface 340 to the side lock surface 328. In some implementations, a first angle $\alpha_1$ defined by the distal end surface 336 and the head surface 338 may be obtuse, i.e., greater than 90 degrees. Alternatively, the first angle $\alpha_1$ may be equal to any suitable value, such as less than or equal to 90 degrees. In some implementations, a second angle $\alpha_2$ between the head surface 338 and the shoulder surface 340 may be acute, i.e., less than 90 degrees. Alternatively, the second angle $\alpha_2$ may be equal to any suitable value, such as greater than or equal to 90 degrees. Accordingly, the head surface 338 may extend from the shoulder surface 340 to the distal end surface 336 at a non-orthogonal angle relative to the central axis $A_{302}$ such that at least a portion of the head surface 338 is axially and circumferentially offset from the lower lock surface 342 to form a ramp.

The entrance portion 322a of the slot 322 is defined by the side entrance surface 326, a portion of the upper surface 324, and the distal end surface 336. The lock portion 322b is defined by a portion of the upper surface 324, the side lock surface 328, the shoulder surface 340, and the lower lock surface 342. Each slot 322 is configured to receive the corresponding protrusion 116 at the entrance portion 322a. A subsequent rotation of the end cap 300 causes each protrusion 116 to move from the entrance portion 322a to the lock portion 322b, as set forth in more detail below.

Figure 6:
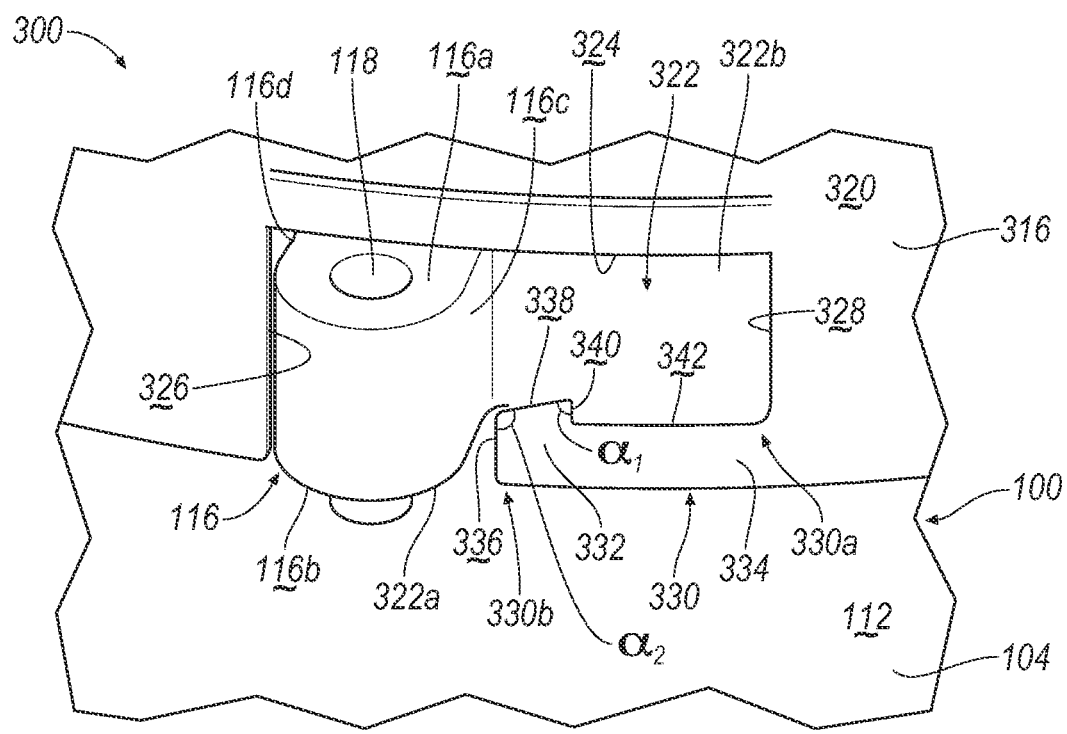
FIG. 6 is a detailed perspective view of a portion of the filter assembly of FIG. 1 with an end cap in an unlocked position.
Figure 7:
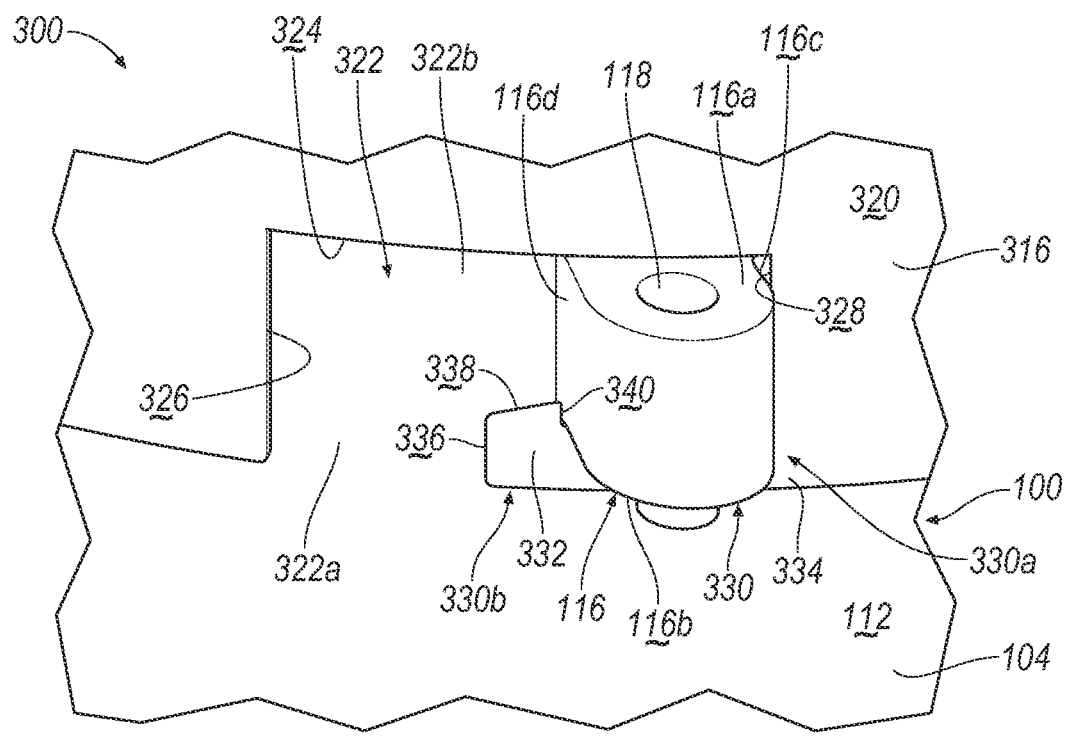
FIG. 7 is a detailed perspective view of a portion of the filter assembly of FIG. 1 with an end cap in a locked position.
Figure 8:
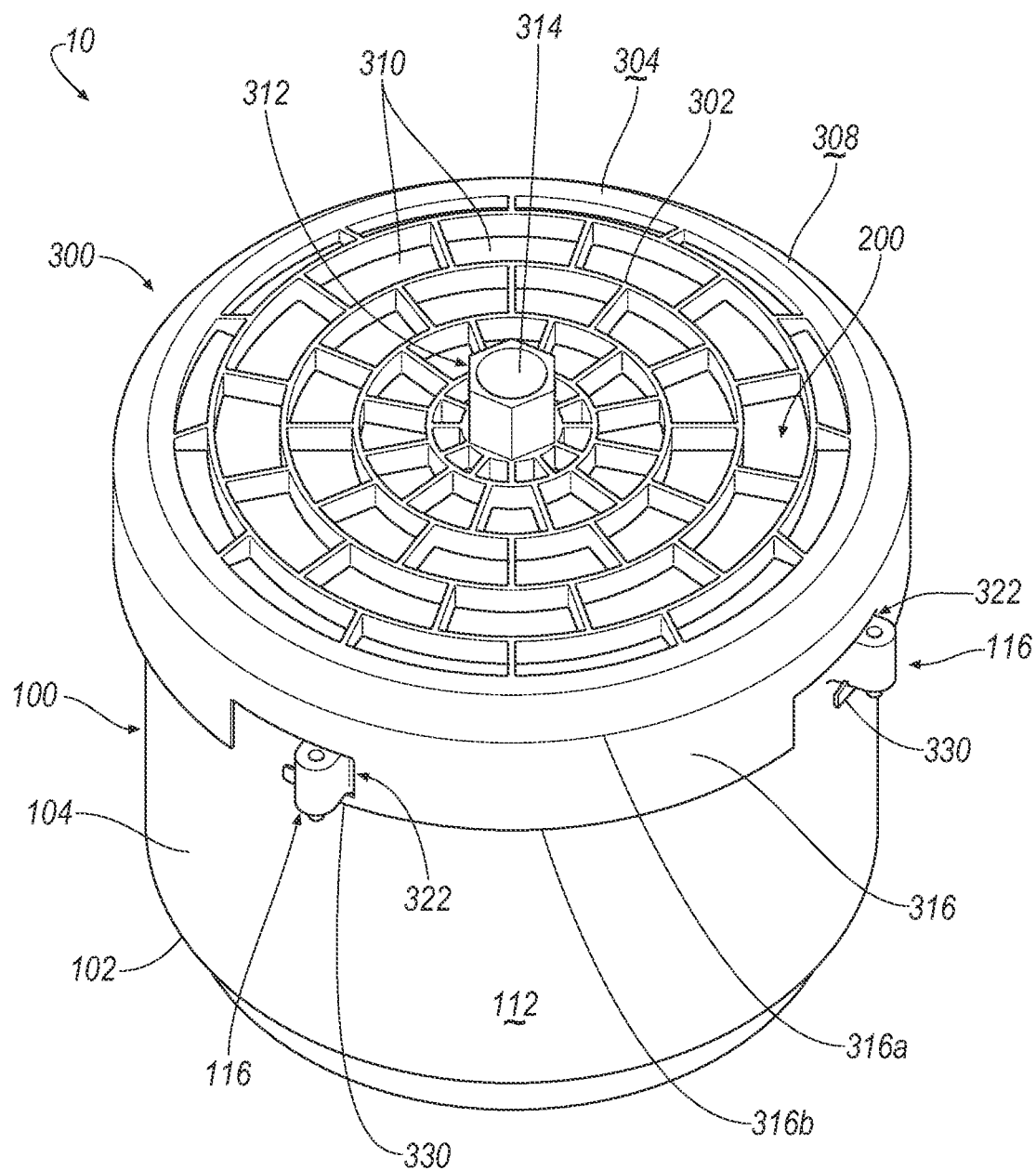
FIG. 8 is a perspective view of the filter assembly of FIG. 1 with an end cap in a locked position.

Referring to FIGS. 1 and 6, a method of assembling the filter assembly 10 may include positioning the filter element 200 within the interior volume 120 of the housing 100, and the end cap 300 in an assembled, unlocked position relative to the housing 100. In particular, the protrusion 116 may be disposed within the entrance portion 322a of the slot 322. In this position, the lower surface 306 of the main body 302 may be engaged with the upper edge 114 of the outer wall 104. To secure the end cap 300 relative to the housing 100, and the filter element 200 within the interior volume 120, the end cap 300 may be moved to the locked position (as shown in FIGS. 7 and 8) by rotating the end cap 300 in a clockwise direction about the center axis $A_{302}$. As one example, a user may grasp and twist the protrusion 312 with their hand to rotate the end cap 300. As another example, a user may couple a wrench to the protrusion 312 to rotate the end cap 300. In some implementations, the end cap 300 may be pushed toward the housing 100, i.e., in a direction parallel to the center axis $A_{302}$, to create a compressive force causing the lower seal 206 to compress prior to and during rotation of the end cap 300. For example, as the end cap 300 rotates about the center axis $A_{302}$, the head surface 338 may slide along the lower surface 116b, such that the angles $\alpha_1$, $\alpha_2$ force the end cap 300 towards the housing 100 in a direction substantially (e.g., +/−5 degrees) parallel to the axis $A_{302}$. The compressive force may be employed until the upper surface 116a of the protrusion 116 abuts the upper surface 324 of the slot 322. When the end cap 300 rotates, the shoulder surface 340 may slide along the corner of the lower surface 116b and the first side surface 116c of the protrusion 116 until the shoulder surface 340 is adjacent the second side surface 116d of the protrusion 116 and the protrusion is in the lock portion 322b of the slot 322.

Upon release of the compressive force upon the end cap 300, the end cap 300 may move slightly away from the housing 100 until the lower lock surface 342 of the body portion 334 of the flange 330 engages the lower surface 116b of the protrusion 116. At this point, the end cap 300 is in the locked position, with the upper surface 116a facing and adjacent to the upper surface 324, the lower surface 116b facing and adjacent the lower lock surface 342, the first side surface 116c facing and adjacent the side lock surface 328, and the second side surface 116d facing and adjacent to the shoulder surface 340. Thus, the end cap 300 is selectively secured to the housing 100 via engagement of the protrusions 116 and the slots 322. In this regard, in the locked position, engagement of the second side surface 116d with the shoulder surface 340 and engagement of the first side surface 116c with the side lock surface 328 can prevent the end cap 300 from rotating about the axis $A_{302}$ relative to the housing 100.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed above could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A filter assembly comprising:
   a housing including an interior surface, an exterior surface opposite the interior surface, and a protrusion extending from the exterior surface, the interior surface defining an interior volume;
   a filter element configured to be disposed at least partially in the interior volume of the housing; and
   an end cap including an axially-extending outer rim defining a slot configured to receive the protrusion to inhibit rotation of the end cap relative to the housing, the outer rim of the end cap having an inner diameter greater than an outer diameter of the exterior surface of the housing and extending over a portion of the exterior surface.

2. The filter assembly of claim 1, wherein the end cap includes a flange having a proximal end and a distal end opposite the proximal end, the proximal end supported by the outer rim, and the distal end at least partially disposed within the slot.

3. The filter assembly of claim 2, wherein the distal end of the flange includes a head portion defining a head surface and a shoulder surface extending from the head surface.

4. The filter assembly of claim 3, wherein an angle between the head surface and the shoulder surface is less than 90 degrees.

5. The filter assembly of claim 2, wherein, when the end cap is secured to the housing, an inner surface of the flange is adjacent the exterior surface of the housing.

6. The filter assembly of claim 1, wherein the end cap includes a main body and a second protrusion extending from the main body, the outer rim extending from the main body in a direction opposite the protrusion.

7. The filter assembly of claim 6, wherein a center axis of the second protrusion is coaxial with a center axis of the main body, and wherein the end cap is movable between an unlocked position and a locked position relative to the housing via rotation of the end cap about the center axis of the main body.

8. The filter assembly of claim 1, wherein:
the housing defines a second protrusion extending from the exterior surface of the housing and spaced from the protrusion,
the outer rim defines a second slot configured to receive the second protrusion, and
the end cap includes a second flange extending into the second slot, the end cap being secured to the housing via simultaneously positioning the protrusion within the slot and the second protrusion within the second slot.

* * * * *